(12) United States Patent
Moseler et al.

(10) Patent No.: US 9,796,615 B2
(45) Date of Patent: Oct. 24, 2017

(54) GLASS PROCESSING DEVICE AND BOTTOM MACHINE THEREFOR FOR MANUFACTURING GLASS CONTAINERS

(71) Applicant: SCHOTT AG, Mainz (DE)

(72) Inventors: Doris Moseler, Budenheim (DE); Robert Frost, Eggersriet (CH); Ulrich Lange, Mainz (DE); Boban Markovic, St. Gallen (CH); Volker Rupertus, Alzey (DE); Bernhard Hladik, Gua-Odernheim (DE)

(73) Assignee: SCHOTT AG, Mainz (DE)

( * ) Notice: Subject to any disclaimer, the term of this patent is extended or adjusted under 35 U.S.C. 154(b) by 0 days.

(21) Appl. No.: 15/171,068

(22) Filed: Jun. 2, 2016

(65) Prior Publication Data

US 2016/0272527 A1    Sep. 22, 2016

Related U.S. Application Data

(62) Division of application No. 14/314,351, filed on Jun. 25, 2014, now Pat. No. 9,409,808.

(30) Foreign Application Priority Data

Jun. 25, 2013  (DE) .............. 10 2013 212 150

(51) Int. Cl.
  *C03B 23/11*  (2006.01)
  *C03B 9/38*  (2006.01)
(52) U.S. Cl.
  CPC .......... *C03B 9/3816* (2013.01); *C03B 9/3841* (2013.01); *C03B 9/3866* (2013.01); *C03B 23/112* (2013.01)

(58) Field of Classification Search
  CPC ....... C03B 9/38; C03B 9/3866; C03B 9/3841; C03B 9/3816; C03B 23/112
  (Continued)

(56) References Cited

U.S. PATENT DOCUMENTS 1,700,326 A    1/1929   Miller
2,193,376 A    3/1940   Pearson
(Continued)

FOREIGN PATENT DOCUMENTS

DE    10332176       2/2004
DE    10341300 B3    1/2005
(Continued)

OTHER PUBLICATIONS

German Office Action for corresponding German Application No. 10 2013 212 150.4 dated Feb. 2, 2014 with English translation, 7 pages.

*Primary Examiner* — Mark Halpern
(74) *Attorney, Agent, or Firm* — Ohlandt, Greeley, Ruggiero & Perle, L.L.P.

(57) ABSTRACT

A bottom machine is provided for a glass processing device to manufacture glass containers from glass tubes. The bottom machine includes one or a plurality of holding units for holding the glass container or glass tube, with the holding units being mounted so as to rotate around an axis of rotation of the bottom machine in order to convey the glass container or glass tube to various processing positions, a pressure source for supplying a gas flow, a duct system communicating with the pressure source for directing the gas flow to the holding units and for feeding the gas flow into the glass tube or into the glass container, with the duct system being designed to be free of gaps.

19 Claims, 4 Drawing Sheets

(58) Field of Classification Search
USPC .......................................................... 65/111
See application file for complete search history.

(56) References Cited

U.S. PATENT DOCUMENTS

| | | | |
|---|---|---|---|
| 2,199,332 | A | 4/1940 | Dichter |
| 2004/0129026 | A1 | 7/2004 | Bartsch |
| 2016/0016841 | A1* | 1/2016 | Frost ........................ C03B 21/06 65/29.1 |

FOREIGN PATENT DOCUMENTS

| | | |
|---|---|---|
| EP | 0293661 A1 | 12/1988 |
| FR | 1004160 | 3/1952 |
| GB | 527692 | 10/1940 |
| GB | 736391 | 9/1955 |

* cited by examiner

GLASS PROCESSING DEVICE AND BOTTOM MACHINE THEREFOR FOR MANUFACTURING GLASS CONTAINERS

CROSS REFERENCE TO RELATED APPLICATIONS

This application is a divisional of U.S. application Ser. No. 14/314,351 filed Jun. 25, 2014, which claims benefit under 35 U.S.C. §119(a) of German Patent Application No. 10 2013 212 150.4, filed Jun. 25, 2013, the entire contents of both of which are incorporated herein by reference.

BACKGROUND OF THE INVENTION

1. Field of the Invention

The present invention relates to a bottom machine for a glass processing device for manufacturing glass containers made from a glass tube, comprising one or a plurality of holding units for holding the glass tube or glass container, with the holding units being mounted so as to rotate around their own axis and around an axis of rotation of the bottom machine in order to convey the glass tube to various processing positions, a pressure source for supplying a flow of gas, and a duct system that communicates with the pressure source for directing the gas flow to the holding units and for feeding the gas flow into the glass tube or glass container. The invention further relates to a glass processing device as well as a method for manufacturing glass containers.

2. Description of Related Art

Glass containers that are manufactured using generic glass processing devices have a cylindrical section or conical section. In particular, generic glass processing devices are used to manufacture glass containers as syringes and vials, the syringes and vials being used primarily for storing and administering pharmaceutical products, such as medications.

U.S. Pat. No. 1,700,326 A, U.S. Pat. No. 2,193,376 and EP 0 293 661 A1 show devices in which glass containers are obtained from a glass melt by means of a blowing method. In this process, a specific volume of the glass melt is placed in a mold, the glass having a very high temperature (approximately 1600° C.). A cavity is then produced by, for example, inserting a mandrel into the molten glass. Afterwards, compressed air (several bars) is blown into the cavity, so that the glass presses against the walls of the mold and consequently is molded. In order to remove the resulting glass containers from the mold, it must be possible to open the mold. Conventionally, there are two parts of the mold that can be opened. However, in order to prevent deformation of the glass container when the mold is opened, the mold must be cooled, at least at the contact surface between glass and mold, to a temperature that affords the glass containers a certain degree of form stability (approximately 600° C.). Therefore, it must be possible to cool the mold, which can also be conducted by way of the compressed air. In addition, it must be possible to remove the glass container from the mold by using tongs, for example, so that there must be a certain degree of form stability before the glass container can be removed from the mold. In general, glass containers that are manufactured using the blowing method are suitable for storing pharmaceutical products. However, the glass containers resulting from the blowing method have a wall thickness that varies greatly. On account of the optical distortions resulting from this, automated product inspection is possible to only a very limited extent.

DE 103 41 300 B3 shows a generic glass processing device for manufacturing glass containers from a glass tube; however, in this case, no air or other gas can be fed into the glass tube.

Glass processing devices of the kind mentioned in the beginning have a parent machine and a bottom machine, both of which can rotate and have a number of holding units, which comprise a clamp chuck, for example. Usually, the bottom machine is arranged below the parent machine. A glass tube that is approximately 1.5 m in length is clamped in the clamp chuck of the parent machine, the glass tube protruding downward from the clamp chuck by a specific length. At its downward protruding open end, the glass tube undergoes certain processing operations, which are performed at different processing positions. To this end, the parent machine and, together with it, the clamp chuck are rotated by a certain angle from one processing position to the next. If the downward protruding end of the glass tube has been completely processed, so that, for example, it has a rolled edge or a thread, then a part of the glass tube has to be severed. The corresponding clamp chuck of the parent machine is aligned with a clamp chuck of a holding unit of the bottom machine at the processing position at which the severing step is performed. The holding unit of the bottom machine can move axially and grasps the glass tube somewhat above the downward protruding end of the glass tube. In the region between the clamp chuck of the parent machine and the clamp chuck of the bottom machine, a gas burner is usually directed at the glass tube in order to heat it, with it being possible to heat the glass tube in other ways as well. In this case, the gas burner is placed in a fixed position. In order to heat the glass tube in a manner that is as rotationally symmetric as possible, the holding units can rotate around their own axis. As a result of rotating the glass tube, it is heated not only at one site by the gas burner, but the heating is distributed uniformly over the circumference. The glass tube is heated until it is sufficiently viscous that the part that is clamped in the clamp chuck of the bottom machine can be severed from the remaining part of the glass tube by lowering the clamp chuck of the bottom machine. In the process, the heated part of the glass tube tapers and constricts to such an extent that a closed bottom forms at the severing site, one at the drawn-off part situated in the clamp chuck of the bottom machine and one at the part of the glass tube remaining in the clamp chuck of the parent machine.

In the following, the part that is situated in the clamp chuck of the bottom machine will be considered. As already discussed, the free open end is already completely processed, but the bottom of the now resulting glass container is not yet in its desired form. In this stage of processing, the bottom of the glass container is situated above the open end in relation to the direction of action of gravity, this entailing the following: As described above, the bottom is produced by a thermal severing step, so that the viscosity of the glass in the bottom region is still so high that the bottom sags more or less strongly downward depending on the diameter of the glass tube used. In addition, the bottom exhibits a radially changing wall thickness. In order to be able to furnish the bottom of the glass container with the desired characteristics, it needs to undergo yet further, primarily thermal processing steps. In order to counteract the sagging of the bottom, a gas, usually air, is blown into the glass container through the open end of the glass container, as a result of which a back pressure that supports the bottom is created. Depending on which processing steps remain to be performed, a sufficient amount of gas is blown in to cause the bottom to bulge upward, as a result of which the accessibility of the bottom to processing tools, such as gas burners, is increased. Finally, the glass container is brought to the desired length, this being accomplished by pressing the bottom against a bottom template. To this end, a gas flow is fed into the glass container, resulting in the creation of back pressure when it meets the bottom and pressing the bottom against the bottom template. However, because the glass container is open, no significant static overpressure is created in the glass container. Both the static overpressure and the back pressure amount to no more than 1 mbar.

Blowing in a gas flow has yet another aspect. Borosilicate glasses are preferably used for storing pharmaceutical products, because they offer high hydrolytic resistance at relatively low cost. Borosilicate glasses also contain sodium to lower their melting point. However, Na ions are not bound valently in the glass, but rather migrate through the glass matrix, which is defined primarily by $SiO_2$. If the glass tube is heated to sever it, temperatures of greater than 1200° C. are necessary, such temperatures clearly lying above the vaporization temperature of sodium. Consequently, large amounts of Na vaporize from the bottom and deposit once again at various sites in the vial. The vaporization of sodium also has the effect that boron is entrained in the form of borates and also vaporizes, even though the borates, in comparison to sodium, are markedly more strongly bound in the glass matrix.

The glass container is thermally treated very strongly at the bottom, whereas, at the cylindrical section, no thermal treatment takes place. As a result of this, strong thermal stresses are created in the glass container, leading to potential cracking of the glass container after cooling. In order to prevent this, a further thermal treatment needs to be performed so as to relieve the stresses. This thermal treatment takes place at approximately 600° C., that is, clearly below the temperatures that are necessary for severing the glass container from the glass tube. In the process, a large part of the sodium borate vaporizes. The part that does not vaporize bakes into the walls of the glass container. This poses a problem in that Na ions can migrate into the substance stored in the glass containers. Particularly in the case of pharmaceutical substances, this is undesirable. The migration tendency strongly depends on the substances being stored in the glass containers and the pH value thereof. As a result of introducing the gas flow into the glass container or into the glass tube, part of the sodium is also removed from the glass container during the severing process, so that less sodium is able to bake into the walls. In this context, the tendency for sodium to be able to migrate into substances being stored in the glass containers is also referred to as surface alkalinity, which can also be reduced by blowing in gas in a undefined manner.

Blowing air into the glass container or into the glass tube is conducted in known glass processing devices as follows: Below the clamp chuck of the bottom machine, a tube runs parallel to the axis of rotation of the bottom machine, with the outlet opening of the tube being situated directly below the open end of the glass tube or glass container. Placed along the circular path traveled by the clamp chuck of the bottom machine is a correspondingly curved bottom tube furnished with a slot or a number of holes, which are arranged on the top surface. The inlet opening of the tube running parallel to the axis of rotation of the bottom machine is situated at a specific distance above the bottom tube. The bottom tube is charged with gas, usually air, which leaves the slot or the holes and enters the respective inlet opening. As mentioned at the beginning, the holding units or the clamp chucks can be rotated for uniform heating of the glass tube or glass container. The tube running parallel to the axis of rotation of the bottom machine rotates along with them.

The holes are unprotected toward the top, so that they can become quickly plugged by glass splinters, oil, and other particles that are present in the harsh surroundings of the glass processing machine. Consequently, the flow conditions change in the region between the bottom tube and the inlet opening, so that it is nearly impossible to feed a reproducible gas flow from the pressure source into the glass container or glass tube. It can never be known what volume flow actually enters the glass container or glass tube. It is noted at this point that it depends on the progress of the processing whether the gas still is being fed into the glass tube or else into the already existing glass container with closed bottom. Blowing is performed regardless thereof.

Not only sodium borates, but alkali borates in general have yet another detrimental property. The rate of vaporization of alkali borates increases exponentially with increasing temperature. When the bottom of the glass container is processed, sodium borate vaporizes out of the bottom region and deposits once again in a condensation zone on the walls of the glass container. The glass is already relatively cold in the condensation zone. However, an inward diffusion zone forms between the bottom and the condensation zone, in which more sodium borate diffuses into the glass than vaporizes. Consequently, there results an enrichment of sodium borate in the inward diffusion zone and a depletion in the bottom, with the depletion in the bottom having no negative consequences. However, the enrichment of borate in the inward diffusion zone has the following consequences:

In the near-surface region of the inward diffusion zone (approximately 30 to 200 μm from the inner surface of the glass container), the enrichment of boron has the effect that the borosilicate glass, composed primarily of Si, Na, and B, is no longer miscible after cooling, because there is a miscibility gap in the ternary phase diagram here. Consequently, two phases of different composition are formed, which necessarily also have different chemical and physical properties. One of the two phases also exhibits a lower hydrolytic resistance, so that it is more readily attacked, resulting in stresses in the near-surface region of the inward diffusion zone. As a result of this, particle-shaped glass components detach from the surface, these components having a clearly smaller dimension in one axis than in a plane perpendicular to this axis. These particles then enter the substance stored in the glass container, this having particularly great consequences when the substance is administered as a medicine. The tendency for detachment of these flaky particles is also referred to as the delamination tendency.

In known glass processing devices, the machine operator in charge adjusts the magnitude of the gas flow on the basis of his experience, such that the bottom obtains the desired geometric properties and the limit values set for surface alkalinity are not exceeded. Another machine operator can achieve the same geometric properties of the bottom and the desired values of surface alkalinity with an entirely different magnitude of the gas flow. Reproducibility is not afforded. However, the delamination tendency cannot be reliably lowered into uncritical ranges with known glass processing devices and, for a long time, was not the focus of manufacturers of glass containers for the above-mentioned purposes.

SUMMARY

An object of the present invention is therefore to further develop a glass processing device and a bottom machine for this glass processing device of the kind mentioned in the beginning such that the delamination tendency of glass containers, in particular those made of borosilicate glass, can be clearly reduced. Another object of the present invention is to specify a method for manufacturing glass containers from a glass tube, particularly a glass tube made of borosilicate glass, by means of which the delamination tendency of glass containers manufactured in this way can be markedly reduced.

The delamination tendency of glass containers that are manufactured by means of the bottom machines mentioned in the beginning can be reduced by designing the duct system without gaps. As mentioned above, duct systems of conventional bottom machines have a bottom tube and a tube running perpendicular thereto. On account of fabrication inaccuracies, a gap is necessarily created between the bottom tube and the tube directed perpendicular to it, the dimensions of which change when the bottom machine rotates. Furthermore, particles and other foreign matter can accumulate in the gap, something that is not unlikely owing to the extreme conditions that prevail in the surroundings of the bottom machine during glass manufacture. Consequently, unpredictable vortexes, turbulence, and splitting of the gas flow arise in the gap, so that only a portion of the gas flow is indeed fed into the tube running perpendicular. Therefore, it is not possible to make any reproducible statements about the volume flow that is actually fed into the glass container or into the glass tube. On account of the gap-free design of the duct system of the bottom machine according to the invention, the gas flow is fed, without any interference and without any interruption, from the pressure source to the holding units and into the glass tube, so that, regardless of the rotary position of the bottom machine, the same volume flow or the same mass of gas flow is always fed into the glass tube or into the glass container. It has been found that the delamination tendency can be reduced when the gas flow is fed into the glass tube or into the glass container with a clearly defined, laminar flow and a specific flow rate during the various processing steps and can also leave once again in a defined manner. This is made possible by the gap-free design of the duct system, which could not be achieved in conventional duct systems. In accordance with the invention, the delamination tendency can be clearly reduced without the other functions of the gas flow, namely, the raising of the viscous bottom and the lowering of the surface alkalinity below a specific limit value, being lost or becoming less pronounced.

In a preferred embodiment, the bottom machine according to the invention has a rotor and a stator, with the holding units being arranged on the rotor and the duct system having a first number of subducts arranged on a rotor section and a second number of subducts arranged on a stator section as well as a feedthrough section for gap-free conveyance of the gas flow from the stator section to the rotor section. The feedthrough section is understood to mean the section in which the duct system transitions from the stator into the rotor. The stator section is understood to mean the section of the duct system that, when the bottom machine is in operation, is fixed in position. In accordance therewith, the rotor section is understood to mean the section of the duct system that rotates during operation. Consequently, the stator and rotor sections also comprise regions of the duct system going beyond the stator and rotor as such. The number of subducts arranged on the rotor section and the number of subducts arranged on the stator section need not be the same. In this embodiment, the gas flow can reach the holding unit only when a subduct arranged on the rotor section overlaps or is aligned with a subduct arranged on the stator section in the feedthrough section. As mentioned in the beginning, the glass tube or glass container is transported from one processing position to the next by rotation of the rotor. The time that is required for transport from one processing position to the next is usually markedly shorter than the time during which the glass tube or glass container resides in a processing position. Therefore, it is sufficient when the gas can flow to the holding device only in the respective processing position. Therefore, the subducts arranged on the rotor and stator sections run such that they overlap only when the respective holding units and the glass tubes or glass containers clamped in them are situated in the respective processing positions or in the immediate vicinity thereof. Depending on which processing step is being carried out, a gas flow will no longer be needed, particularly when the bottom has already been completely processed and its temperature has cooled sufficiently so that it has adequately solidified and no longer requires any support. Consequently, it is not necessary for a subduct on the stator section to be assigned also to a subduct of the rotor section in each processing position.

The combination of a rotor and a stator has a number of advantages. In particular, it is possible to arrange the pressure source and parts of the duct system, such as distributors, valves, etc., at fixed positions, which thereby become part of the stator section of the duct system. As a result, it is possible to reduce the design expense. The holding units are arranged on the rotor so as to ensure that the glass tube or glass container can be transported from one processing station to the next. Accordingly, it is overall possible to provide a compact bottom machine in a structurally simple manner. In particular, no rotary feedthroughs for electrical cables are necessary. However, this embodiment entails the necessity of designing the feedthrough section that is arranged at the downstream end of the stator section and at the upstream end of the rotor section such that, in spite of the relative movement between the rotor and the stator taking place in the feedthrough section, the duct system is designed so that no gap is created, which can have a negative effect on the gas flow and hence impede the correctly targeted feed of the gas flow into the glass tube or glass container. Here, however, there exist known possibilities for transferring gasses from resting into rotating parts. Mechanical seals or piston rings can be employed in this case in order to seal the rotor with respect to the stator and thus to ensure the flow of gas from the pressure source to the holding units without any interruption. Consequently, in this embodiment, the advantages of a rotor-stator arrangement can be combined with the idea, according to the invention, of feeding a defined gas flow into the glass tube, so that a compact bottom machine is created, by means of which the delamination tendency of glass containers made from the glass tube can be markedly reduced.

In an advantageous embodiment, the stator and the rotor are designed such that a gap seal is created in the feedthrough section to seal the duct system. It should be noted in this context that the provision of a gap seal is not in contradiction with the object according to the invention of designing the duct system to be gap-free. In contrast to the above-described gaps of known bottom machines, the gap seal—as its name already states—has a sealing effect, because the rotor and the stator do not exceed a specific maximum distance of separation, which takes into consideration the gas used, among other things, and also does not change substantially during operation. In addition, the rotor and/or the stator can be provided with a specific surface design in order to enhance the sealing effect. Furthermore, the gap seal is protected, so that no particles can penetrate into it from the outside. Gap seals have the advantage that no sealing elements need to be used, which, on account of the relative movement between rotor and stator, would be subject to wear. Consequently, the reliability and the lifetime of the bottom machine according to this embodiment are increased, without any notable disruption in the gas flow during its transition from the stator into rotor, so that the delamination tendency of the glass containers can be markedly reduced.

Preferably, the rotor is arranged radially outside of the stator. The stator is thus axially accessible, so that connections, electrical cables, and other components of the stator section of the duct system can be arranged in a space-saving manner, yet nonetheless be readily accessible.

In an advantageous embodiment, one or a plurality of the subducts in the feedthrough section have an extension running in a plane perpendicular to the axis of rotation. As already discussed above, the gas can only flow from the stator section into the rotor section and further on to the respective holding unit when one of the subducts arranged on the stator section overlaps with one of the subducts arranged on the rotor section, this typically being the case when the holding unit and the glass tube or glass container is situated in one of the processing positions or in the vicinity thereof. The extension of the duct system in the feedthrough section results in an enlargement of the overlap region between the respective subduct of the rotor section and the respective subduct of the stator section, so that the time during which the gas flow is interrupted is reduced. As mentioned in the beginning, the gas flow serves, among other things, also to support the bottom of the glass container, which, on account of the thermal treatment, has such a low viscosity that it sags in the effective direction of the force of gravity. If the time during which the gas flow is interrupted is reduced, the bottom is supported for a longer period of time, this having a positive effect on the quality of the bottom being formed. Furthermore, the shortening of the time during which the gas flow is interrupted also reduces the delamination tendency, because, during an interruption of gas supply into the glass container, the inward diffusion processes described above can once again take place. The shorter the interruption, the shorter are also the inward diffusion processes, which leads to a reduced delamination tendency.

This extension in a plane perpendicular to the axis of rotation confines a first angle, which is of a size such that the sealing effect of the gap seal is not lost. The gap seal is able to seal the gas flow in the feedthrough section effectively only when not only does the gap size not exceed a maximum value, but also the gap stretches over a minimum area. If the first angle of the extension of a rotor or stator section is chosen to be too large, the region toward the neighboring subduct in which the gap seal can produce its effect is too small, so that the sealing effect of the gap seal could be lost.

Preferably, the duct system has a control or regulating device for controlling or regulating the flow of gas through the duct system. In this way, the magnitude of the gas flow can be adjusted such that the desired effect on the glass container can be achieved in a reproducible manner. For example, mass flow controllers (MFC) can be utilized for this purpose; such mass flow controllers themselves have a measurement section and an actuator and regulate the volume flow into the glass container. The mass flow controllers are usually combined with the machine control that specifies to the mass flow controllers when a given volume flow is to be supplied. There exists the further possibility of setting not only a specific volume flow, but also of traversing a profile once the gas flow has been released. For example, it may be advantageous to increase the volume flow of the gas flow slowly. The control or regulating device may be arranged on either the rotor or stator.

In an especially preferred embodiment, the duct system has six subducts arranged on the stator section as well as eight subducts arranged on the rotor section and eight holding units, it being conventional to provide maximally the same number of processing positions and holding units, so that the bottom machine is rotated in each case by 45°, in order to transport the glass tube or glass container from one processing position to the next. The choice of six subducts in the stator section depends on the fact that it is usually appropriate to feed a gas flow into the glass tube or glass container only at six processing positions. In the other two processing positions, for example, the glass container is cooled from the outside or removed from the holding unit, for which purpose no gas flow is required. In this embodiment, the bottom machine according to the invention can be integrated into existing processes in an especially easy manner.

In a preferred variant, five of the six subducts arranged on the stator section each have an extension. As mentioned in the beginning, the glass container is thereby brought to the desired length such that the bottom is pressed against a bottom template. To this end, an especially strong gas flow is required to furnish the requisite counterforce. The stator section that is assigned to this processing position does not have any extension and, as a result, the area of the gap seal is maximized, so that it can also securely seal gas flows with high volume flow and high pressure.

The subduct of the stator section that has no extension does have, in this case, a switching valve equipped with a pressure measurement and adjustment device. In this way, it is easier for the machine operator, as needed, to change quickly the pressure and the volume flow when the glass container is pressed against the bottom machine, which ultimately leads to a better quality of the glass container and to less reject.

In another embodiment, the rotor is arranged along the axis of rotation so as to overlap the stator. As a result of the fact that the rotor overlaps the stator at least in part along the axis of rotation, the bottom machine can be designed with a smaller radial extension.

It is further advantageous when the rotor section and/or the stator section has (have) a number of ring-shaped duct segments. Depending on where the ring-shaped duct segments are arranged, a subduct arranged on the rotor section or on the stator section opens into the ring-shaped duct segment. As a result, a subduct is not assigned to a processing position in which, as in the case of the embodiment, the rotor is arranged radially outside of the stator, but rather each subduct is assigned to a holding unit. It is possible by means of the ring-shaped duct segments for the gas flow to be fed to the holding unit without any interruption regardless of the rotary position of the rotor, that is, even when the holding unit is situated between two processing positions, thereby further improving the quality of the resulting glass container. In particular, it is possible to set the volume flow of the gas flow over all of the processing positions in an optimal manner and traverse complex profiles.

Preferably, the ring-shaped duct segments in the feedthrough section are open in the direction of the axis of rotation, with projections for creation of the gap seal protruding into the ring-shaped duct segments. In this embodiment, rotors and stators arranged to overlap along the axis of rotation can be provided with gap seals, so that the advantages of the gap seals can also be utilized in this rotor-stator arrangement.

Preferably, the duct system has a control or regulating device for controlling or regulating the flow of gas through the duct system. In this way, the magnitude of the gas flow can be adjusted such that the desired effect on the glass container can be achieved in a reproducible manner. For example, mass flow controllers (MFC), which can be part of control circuit, can be utilized to this end. There exists the possibility of setting not only a specific volume flow, but also of traversing a profile, which is particularly advantageous in the case of rotors and stators arranged so as to overlap, because, in this case, the gas flow can be varied using a control or regulating device, without any interruption, during the entire processing operation carried out with the bottom machine. The optimal volume flow can be set at any time, which leads to qualitatively especially high-grade glass containers with very small delamination tendency.

In another embodiment, the duct system has another pressure source for supplying a further gas flow, which can be engaged to join the first gas flow by means of a pressure measurement and adjustment device. As already mentioned in the beginning, the length of the glass container is adjusted by pressing the glass container against a bottom template. Required for this purpose is a stronger gas flow than for the other processing steps, this stronger gas flow being supplied by engaging the other gas flow to join it. The pressure measurement and adjustment device makes it easier for the machine operator to engage the other gas flow, as needed, and to adjust its strength.

Preferably, the bottom machine has eight subducts arranged on the stator section, eight ring-shaped duct segments, eight subducts arranged on the rotor section, and eight holding units. Because conventional bottom machines also have eight holding units, the bottom machine according to the invention, which likewise has eight holding units, can be especially well integrated into existing processes.

In this case, it is especially advantageous when the duct system has eight control or regulating devices and eight pressure measurement and adjustment devices. As already described above, another pressure source can be engaged in order to increase the volume flow. In this embodiment, all eight holding units can be charged with an increased volume flow.

In another embodiment, the duct system has exactly one subduct arranged on the stator and a control or regulating device on the rotor for controlling or regulating the flow of gas through the duct system. In this embodiment, the distribution of the gas flow from one subduct to a plurality of subducts is conducted first on the rotor. This affords the advantage that only one subduct needs to be transferred in the feedthrough section from the stator section into the rotor section, thereby simplifying the sealing. In this case, a slip-ring seal can be utilized. It is further possible to operate at higher pressures, so that a higher volume flow can be directed from the stator to the rotor. Furthermore, there is less pressure loss. This affords the advantage that the subducts can have a smaller diameter in comparison to the other embodiments, thereby making possible a more compact structural design of the device according to the invention in this embodiment. Another advantage that ensues from the arrangement of the regulating device on the rotor is that the control or regulation of the gas flow is carried out closer to the site at which the gas flow leaves the duct system and is fed into the glass container or glass tube. Pressure losses, which can occur on the pathway from the pressure source through the feedthrough section into the rotor, can be corrected by the regulating device. Consequently, the desired volume flow can be adjusted more precisely in this embodiment, which, in turn, leads to a reduction in the delamination tendency. Obviously, it is also possible to provide a plurality of subducts on the stator or the stator section and to arrange the regulating device on the rotor. Furthermore, exactly one regulating device can be provided on the rotor or the rotor section and the distribution of the gas flow can be arranged downstream of the regulating device. Alternatively, the distribution of the gas flow can be carried out on the rotor and a regulating device can be provided for each holding unit.

In another embodiment of the bottom machine according to the invention, the duct system has a free end, it being possible for the holding unit to rotate relative to the free end. As mentioned in the beginning, the tube running parallel to the axis of rotation of known bottom machines can rotate together with the holding unit. Hence, no relative rotation of the glass tube or glass container takes place around the tube. If the tube is not aligned with the axis of rotation of the glass tube or glass container or if the tube confines an angle with the axis of rotation, the gas flow will not be fed ideally into the glass tube or into the glass container and a non-rotationally symmetric flow is created within the glass tube or glass container, which, in an unfavorable case, can lead to dead spaces or turbulence.

If, in the case of the bottom machine according to the invention, the glass tube or glass container is rotated around the free end of the duct system when the gas flow is fed in, the effect of not having the gas flow ideally fed in is uniformly distributed, so that, in turn, a rotationally symmetric flow is created in the glass tube or glass container. In this way, the delamination tendency is noticeably reduced even when the gas flow is not fed in ideally.

Another aspect of the invention relates to a glass processing device for manufacturing glass containers from a glass tube, comprising a parent machine and a bottom machine according to one of the preceding exemplary embodiments. The advantages and technical effects that can be achieved using the glass processing device according to the invention correspond to those that have been described for the bottom machine according to the invention. In particular, it is possible to adjust a defined gas flow during the processing of the glass tube and especially of the bottom of the glass container, so that the delamination tendency of the glass container can be markedly reduced.

The object is further achieved by a method for manufacturing glass containers from a glass tube by using a glass processing machine, comprising the following steps:

holding the glass tube or glass container with a holding unit and conveying the glass tube or glass container to various processing positions by use of a transport system, and processing the glass tube or glass container at the respective processing positions, supplying a gas flow by means of a pressure source, directing the gas flow to the holding unit and feeding the gas flow into the glass tube or glass container by way of a duct system that communicates with the pressure source, the duct system being designed such that the gas flow is directed without any gaps to the holding units.

The advantages and technical effects that can be achieved using the method according to the invention correspond to those that have been described for the bottom machine according to the invention. In particular, it is possible to adjust a defined gas flow during the processing of the bottom of the glass container, so that the delamination tendency of the glass container can be markedly reduced. At the same time, it is possible to use the gas flow to support the still hot and thus soft bottom for the further processing, so that it does not sag. Furthermore, it is possible to keep surface alkalinity of the glass container below specific threshold values. It should be noted at this point that the gap-free directing of the gas flow reduces the delamination tendency regardless of the transport system used, with which the glass tube or glass container is conveyed from one processing station to the next. Any transport system that is suitable for conveying the glass tube or glass container to the processing positions can be utilized as the transport system. For example, a linear transport system can be utilized in this case.

Preferably, the method is carried out using a glass processing device, which has a parent machine and a bottom machine according to one of the previously described exemplary embodiments, with the glass tube or glass container being conveyed to various processing positions by rotating the bottom machine. This embodiment of the method according to the invention may be implemented, in the case of the glass processing devices usually employed, by using a parent machine and a bottom machine, without the need to substantially alter the fundamental manufacturing processes. In addition, known parent machines can be used, so that the added structural expense is limited to the bottom machine.

The method according to the invention is further developed by feeding the gas flow into the glass container such that the gas undergoes laminar flow in the glass container and again exits the glass container. As a result of this, the glass container is continuously flushed, so that gaseous substances, in particular alkali borates, which vaporize owing to heating of the bottom region, when the glass container is severed from the remaining glass tube, and can diffuse in the delamination zone into the glass of the glass container, are entrained by the gas flow immediately after the vaporization process and transported out of the glass container. As a result of this, the vaporized substances are prevented from diffusing back into the glass and thereby bringing about a delamination of the glass. The gas flow coats the delamination zone with a certain protective or boundary layer.

The method according to the invention is further developed by rotation of the glass tube or glass container by the holding unit relative to a free end of the duct system when a flow of gas is fed into the glass tube or glass container. Owing to fabrication inaccuracies or dirt or owing to wear when the device according to the invention is operated, it can happen that the lengthwise axis of the last section is not in ideal alignment with the axis of rotation of the glass tube or glass container at the free end of the duct system or a valve positioned there, and/or confines an angle with the axis of rotation. Consequently, the gas flow will not be fed ideally into the glass tube, resulting in the creation of a non-rotationally symmetric flow within the glass tube or glass container, which can lead, in an unfavorable case, to dead spaces or turbulence, so that the delamination tendency in some regions is not reduced or is reduced only to an inadequate extent. When the glass tube or glass container is rotated as the gas flow is fed in, the effect of not having the gas flow ideally fed in is uniformly distributed, so that, in turn, a rotationally symmetric flow is created in the glass tube or glass container. In this way, the delamination tendency is noticeably reduced even for a gas flow that is not fed in ideally.

BRIEF DESCRIPTION OF THE DRAWINGS

The invention will be described below in detail on the basis of preferred exemplary embodiments with reference to the appended drawings. Shown are.

DETAILED DESCRIPTION

Figure 1A:
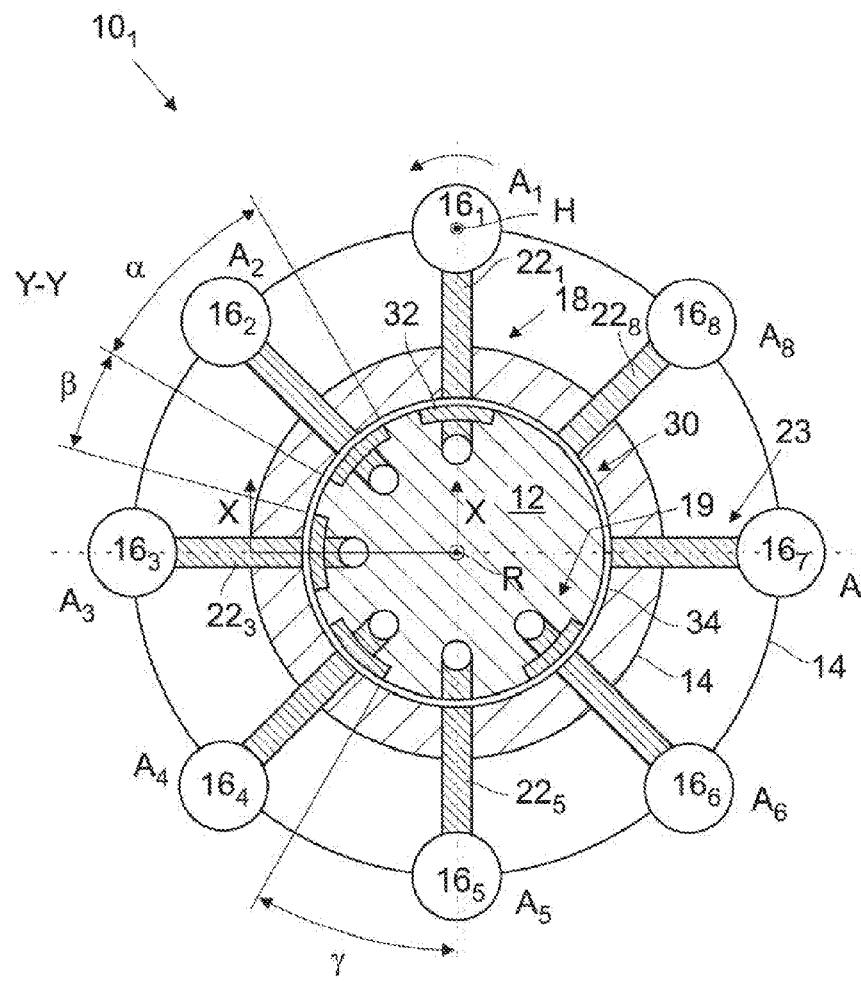
FIG. 1a a first exemplary embodiment of a bottom machine according to the invention on the basis of a plan view, in which the middle part is shown by way of a sectional illustration, FIG. 1b a sectional illustration along the sectional plane defined in FIG. 1a, FIG. 1c an illustration of the basic principle of a duct system of the bottom machine according to the invention in accordance with the first exemplary embodiment, FIG. 2 a schematic diagram of a glass processing device having the bottom machine according to the invention in accordance with the first exemplary embodiment, FIG. 3a a second exemplary embodiment of a bottom machine according to the invention on the basis of a plan view, in which the middle part is shown with a sectional illustration, FIG. 3b a sectional illustration along the sectional plane defined in FIG. 3a, and FIG. 3c an illustration of the basic principle of a duct system of the bottom machine in accordance with the second exemplary embodiment, FIG. 4a a glass container for which the vaporization, inward diffusion, and severing operations during processing are illustrated in a simplified manner, and FIG. 4b a glass container that is processed using a bottom machine according to the invention.
Figure 1B:
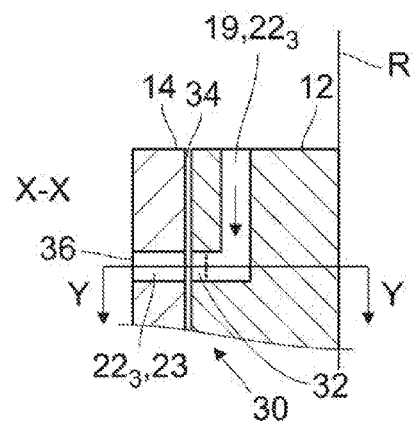
Figure 1C:
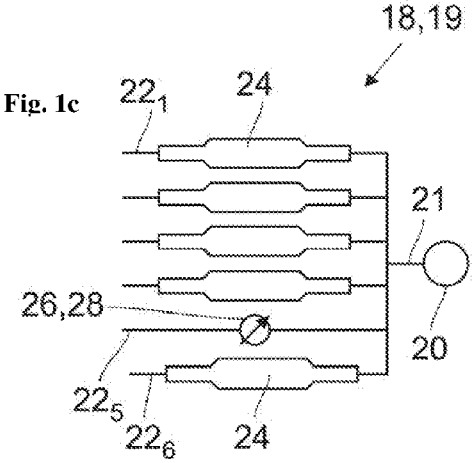

Illustrated in FIG. 1a is a bottom machine according to the invention, $10_1$, in accordance with a first exemplary embodiment. The bottom machine $10_1$ has a stator 12 and a rotor 14, which is arranged radially outside of the stator 12. The rotor 14 is arranged concentrically to the stator 12 and can rotate by means of a drive unit, which is not illustrated, around an axis of rotation R, which, during operation of the bottom machine $10_1$, coincides essentially with the effective direction of the force of gravity. The rotor 14 comprises a number of holding units 16, each of which has a clamp chuck, which is not illustrated in greater detail, in which a glass tube, which is likewise not illustrated in greater detail, can be clamped. The holding unit or the clamp chuck can rotate around its own axis H. In the example illustrated, the rotor 14 has eight holding units $16_1$ to $16_8$. Furthermore, the bottom machine $10_1$ has a duct system 18, with which a gas, such as, for example, air, can be directed from a pressure source 20 to the holding units 16 (see FIG. 1c). Fundamentally suitable are all gases with which it is possible to transport substances escaping from the bottom out of the glass container. In the following, reference will be made to the flow direction resulting from this. The duct system 18 comprises a stator section 19, which shall comprise all ducts, distributors, subducts, etc., that pass through the stator or are arranged in a stationary manner on the stator 12, and a rotor section 23, which comprises all parts of the duct system 18 that pass through the rotor or are arranged on the rotor 14 or are arranged so as to rotate, such as, for example, a valve 56 (see FIG. 4). Shown in FIG. 1c as an illustration of the basic principle is a part of the stator section 19, which, starting from the pressure source 20, has a duct 21, which branches into a total of six subducts $22_1$ to $22_6$. Arranged in each of five of the six subducts 22 is a control or regulating device

24, by means of which the volume flow of the gas that flows from the pressure source 20 to the respective holding units 16 can be controlled or regulated. The subduct $22_5$ does not have any control or regulating device 24, but rather a switching valve 26 with a pressure measurement and adjustment device 28, which is not illustrated in greater detail. The subducts 22 lead to the stator 12, in which, as can be seen from FIG. 1*b*, they continue on in the perpendicular direction and bend radially outward at a certain depth.

As defined, a feedthrough section 30 is to be situated between the rotor 14 and the stator 12, that is, at the point where, in the direction of flow of the gas, the stator section 19 of the duct system 18 ends and the rotor section 23 of the duct system 18 begins. It is particularly evident from FIG. 1*a* that some of the subducts 22 of the stator section 19 have extensions 32 in the feedthrough section 30, which extend over a first angle α in a plane perpendicular to the axis of rotation R, the axis of rotation R constituting the origin of the leg of the first angle α. It can be seen that the subduct $22_5$ does not have any extension. This very subduct $22_5$ also has no control or regulating device 24, but instead the switching valve 26 with the pressure measurement and adjustment device 28.

The stator 12 and the rotor 14 are constructed such that they form a gap seal 34 in order to seal the respective subducts 22 of the duct system 18 in the feedthrough section 30. Alternatively, a sealing element can be arranged between the rotor 14 and the stator 12. Downstream of the feedthrough region 30, the corresponding subduct 22 continues in the rotor section 23 of the duct system 18 and then opens to the outside with formation of an outlet opening 36, where tubes or hoses can be connected via a means of connection not illustrated in greater detail. As mentioned in the beginning, the holding units 16 of the rotor 14 can also move axially along the axis of rotation R of the bottom machine $10_1$, so that, on account of their flexibility, hoses lend themselves to feed the gas flow to the respective holding units 16.

Figure 2:
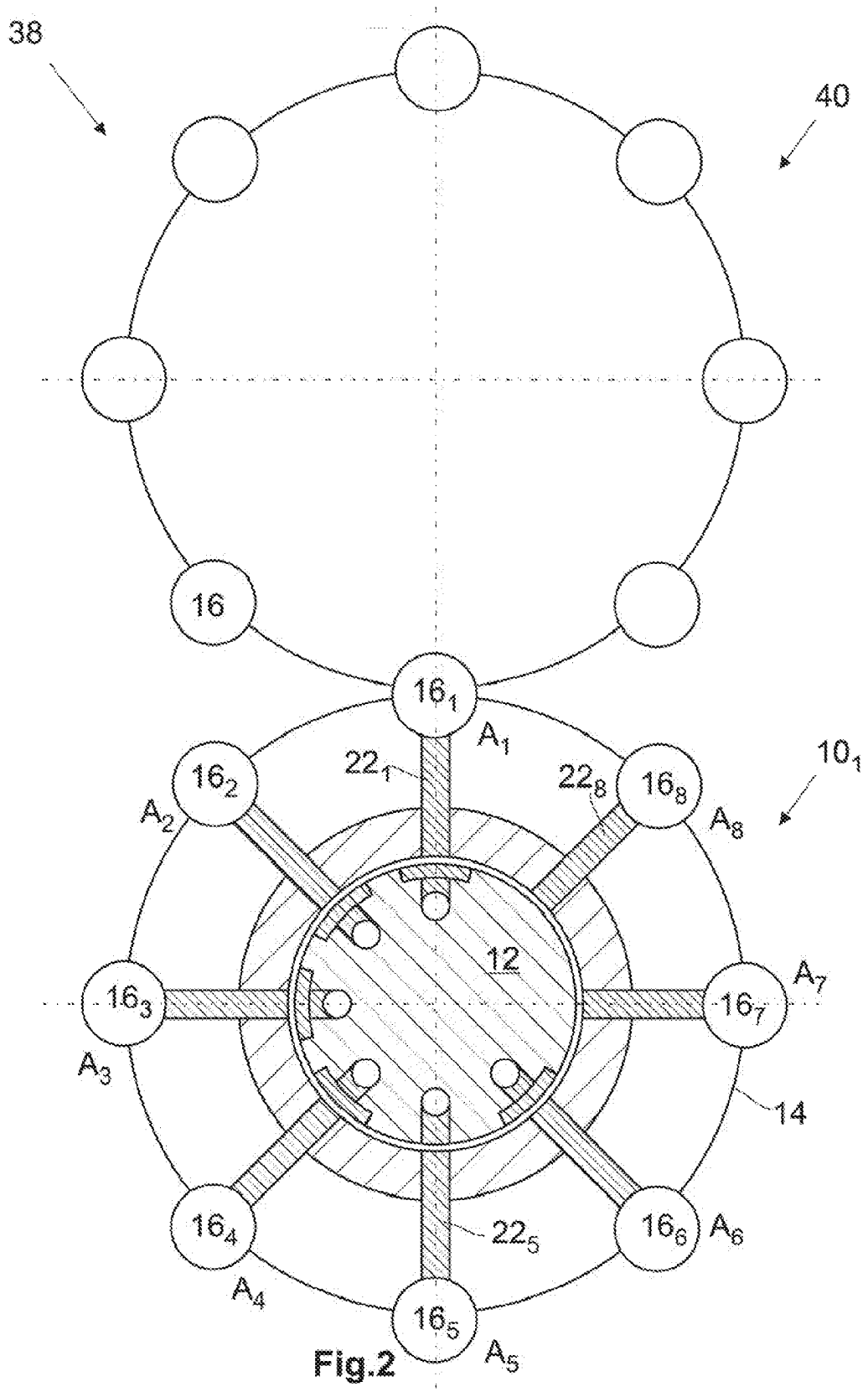

Illustrated in FIG. 2 is a plan view of the principle of operation of a glass processing device 38 with the bottom machine according to the invention $10_1$ in accordance with the first exemplary embodiment. Besides the bottom machine $10_1$, the glass processing device 38 also has a parent machine 40. For manufacture of a glass container 42, which is not illustrated here, a glass tube, which is not illustrated, is initially clamped in a clamp chuck of the parent machine 40. An open end of the glass tube protrudes downward, with respect to the effective direction of the force of gravity, beyond the clamp chuck by a certain amount and undergoes various processing steps in order to form, for example, a rolled edge 44 (see FIG. 4) or a thread. Once the open end is completely formed, the glass tube travels to a processing position $A_1$, in which the clamp chuck of the parent machine 40 is axially aligned with the clamp chuck of the bottom machine $10_1$. The clamp chucks of the parent machine 40 are usually arranged above the clamp chucks of the bottom machine $10_1$, whence the bottom machine $10_1$ has also been given its name. In the original state, the glass tube has a length of approximately 1.5 m, so that the downward protruding part of the glass tube needs to be severed from the remaining part in order to form the glass container 42. To this end, the glass tube is heated at the appropriate site by using a gas burner, which is not illustrated. Once the requisite temperature has been attained, the holding unit 16 travels with the clamp chuck of the bottom machine $10_1$ axially upward in the direction of the clamp chuck of the parent machine 40, so that the latter can grasp the glass tube. Afterwards, the clamp chuck travels once again axially downward, with the glass tube being severed at the site at which it has been heated, thereby forming two closed bottoms. Already in this processing position, a gas flow is fed into the glass tube via the duct system 18. The volume flow of the gas being fed in varies with the volume of the glass container. Typical volumes for glass containers lie between 2 mL and 100 mL. The required volume flow of the gas being fed in for this purpose lies, in this case, between 1 and 20 sL/min (standard liters per minute). The pressures are adjusted correspondingly at the pressure source 20.

Now situated in the clamp chuck of the bottom machine $10_1$ is the glass container 42, which has the already completely formed open end 50 as well as a closed bottom 46, which, however, does not yet have the desired form. In order to form the bottom 46 as desired, it is treated with further gas burners in a targeted manner, for which purpose the bottom machine $10_1$ travels to the processing positions $A_2$, $A_3$, and $A_4$. During the processing by the gas burners, a gas flow is likewise fed into the now closed glass container 42. The gas flow can have a different volume flow for each processing position $A_{1-5}$, which can be altered also during the time in which the glass container 42 is situated in one of the processing positions $A_{1-4}$. In this process, the volume flow can be kept constant. Once the glass container 42 has passed through the processing position $A_4$, the bottom 46 has been completely processed to such an extent that the glass container 42 now can be brought to the desired length. To this end, the glass container 42 is pressed in the processing position $A_5$ against a bottom template, which is not illustrated. In order to be able to supply the requisite counterforce, a stronger gas flow with a higher volume flow is necessary, which, roughly, can amount to between 100 and 200 sL/min. Correspondingly arranged at the processing position $A_5$ is the switching valve 26, so that the machine operator can quickly adjust the gas flow as needed. Because a higher gas flow is present, the subduct $22_5$ does not have an extension 32, so that the gap seal 34 can extend over a larger region and hence also securely seal the gas flow with the higher volume flow and higher pressure. Consequently, the second angle β, which is confined by two adjacent extensions 32, is smaller than the third angle γ, which is confined by the subduct $22_5$ and the extension 32 adjacent to it (see FIG. 1*a*). In the processing position $A_6$, the glass container 42 is cooled, although this is not absolutely essential, depending on the properties of the glass container 42. The now completed finished and largely cooled glass container 42 is removed from the clamp chuck in the processing position $A_7$. In the processing position $A_7$, it is not necessary to feed a gas flow into the glass container 42, so that no subduct 22 is assigned to the processing position. In the processing position $A_8$, generally no processing is conducted, so that, here, too, no subduct 22 is necessary.

Figure 3A:
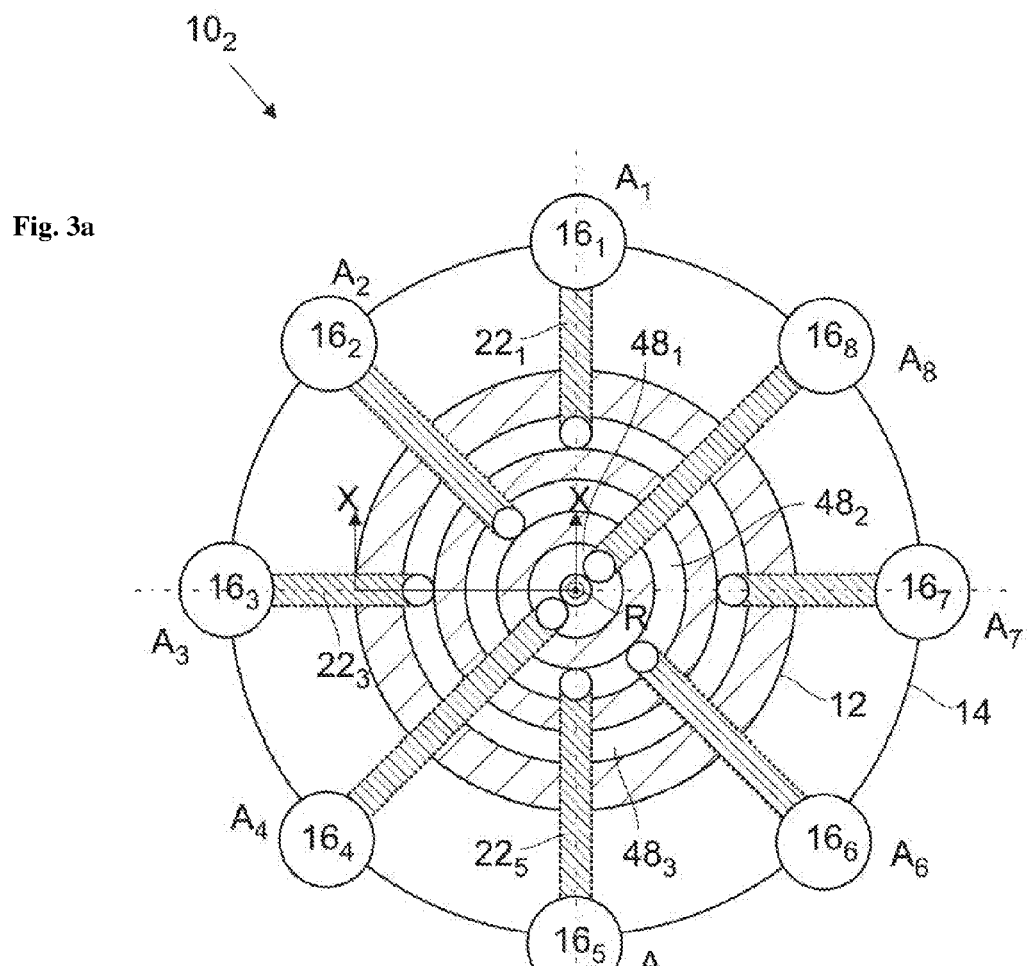
Figure 3B:
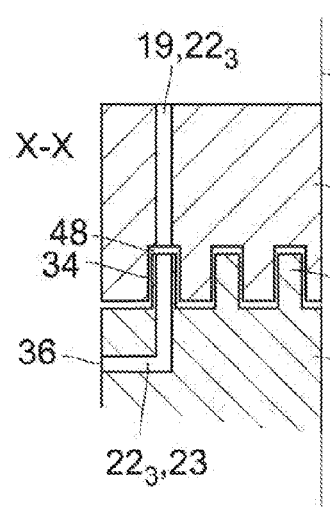

Illustrated in FIG. 3 is a second exemplary embodiment of the bottom machine according to the invention, $10_2$, in which the kind of illustration corresponds to that chosen for the first exemplary embodiment illustrated in FIG. 1. The bottom machine $10_2$ in accordance with the second exemplary embodiment can be integrated into the glass processing device 38, just like the bottom machine $10_1$ in accordance with the first exemplary embodiment. The processing of the glass container 42 proceeds in an essentially identical manner. A key difference is the arrangement of the rotor 14 and the stator 12. In contrast to the first exemplary embodiment, the rotor 14 is not arranged radially outside of the stator 12, but instead below the stator 12 in relation to the axis of rotation R during operation, so that the rotor 14 overlaps the stator 12 in the direction of the axis of rotation R of the bottom machine 10₂. In the illustrated exemplary embodiment, the stator 12 and the rotor 14 have, at least in sections, the same radial extension, as can readily be seen from FIG. 3b.

The subduct 22₃, which is clearly seen in FIG. 3b and is arranged in the stator section 19 of the duct system 18, does not bend radially outward in this exemplary embodiment of the bottom machine 10₂, but rather traverses the stator 12, without any change in direction, parallel to the axis of rotation R and then opens into a ring-shaped duct segment 48, which is open at one end and into which a projection 52 of the rotor 14 protrudes in the mounted state. The subduct 22 on the rotor section 23 of the duct system 18 traverses the projection 52. In this case, the feedthrough section 30 comprises the ring-shaped duct segment 48 and the projection 52, with the projection 52 protruding into the ring-shaped duct segment 48 such that the gap seal 34 is formed. The subduct 22₃ continues on in the rotor section 23 initially axially in the direction of flow of the gas flow and then bends radially outward where it leaves the rotor 14 radially with formation of the outlet opening 36. Once again, a hose can be connected at the outlet opening 36 by a means of connection, which is not illustrated, in order to direct the gas flow to the holding unit 16₃.

In the illustrated exemplary embodiment 10₂, there are a total of three ring-shaped duct segments 48₁ to 48₃, from which run a varying number of subducts, arranged on the rotor section 23. Consequently, three subducts 22, which impose a specific gas flow on the respective ring-shaped duct segment 48, are also necessary on the stator section 19, it being possible to vary the gas flow by means of the control or regulating device 24. In those subducts 22 on the rotor section 23 that run from the same ring-shaped duct segment 48, therefore, the same gas flow is fed in, regardless of the rotary position of the rotor 14. In this embodiment, the ring-shaped duct segment 48 also has a distributor function.

Figure 3C:
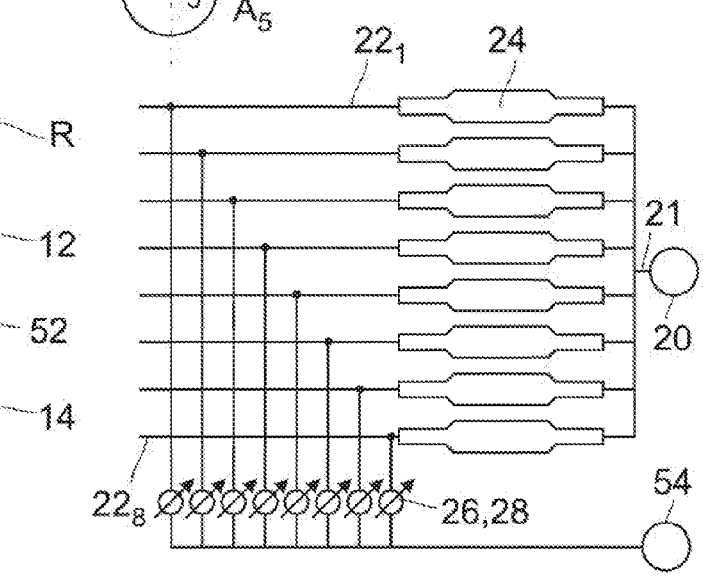

The embodiment shown in FIG. 3a, however, has been chosen primarily for reasons of illustration. For example, the holding units 16₁ and 16₃ hang at the same ring-shaped duct segment 48₃. Consequently, the feed of the gas flow into the glass tube or glass container at the processing position $A_1$ cannot be varied independently of the feed at the processing position $A_3$. It is preferable, therefore, to provide eight ring-shaped duct segments 48, into each of which a subduct 22 on the rotor section 23 protrudes. Consequently, in this case, there are also eight subducts 22 on the stator section 19, as illustrated in FIG. 3c. Thus, the gas flows can be adjusted optimally and independently of one another, regardless of the processing position $A_1$ to $A_8$ in which the glass tube or glass container 42 is situated, the volume flows varying here, too, in the aforementioned ranges. As already mentioned above, the glass container 42 is brought to the desired length in the processing position $A_5$, for which purpose a stronger gas flow is necessary. In this exemplary embodiment of the bottom machine 10₂, another pressure source 54 is engaged by means of a respective pressure measurement and adjustment device 28 for each of the eight subducts 22₁ to 22₈ on the stator section 19, as long the glass container 42 is situated in the processing position.

In both embodiments of the bottom machine according to the invention, 10₁, 10₂, the control or regulating device 24 is arranged in the stator section 19. However, it is also possible to arrange the control or regulating device 24, which may be designed as a mass flow controller, for example, on the rotor section 23. An actuation of the mass flow controller can occur via a wireless link, for example, so that no rotary feedthroughs for cables are necessary.

Figure 4A:
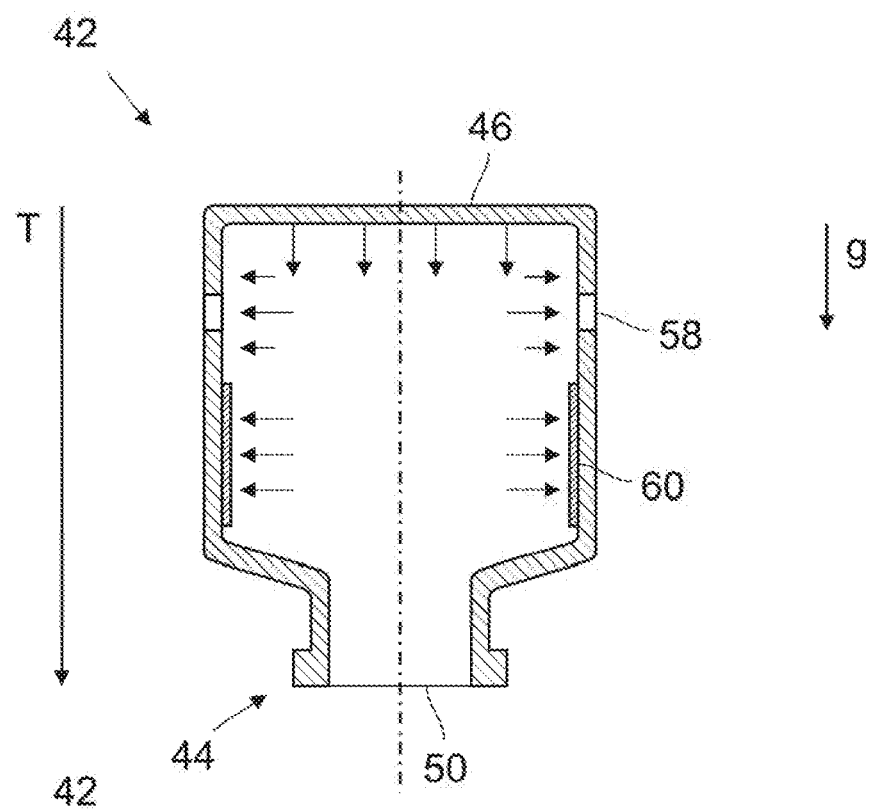

Illustrated in FIG. 4a is a glass container 42, by means of which the operations according to the invention during the manufacturing process are to be described in greater detail. The glass container 42 is illustrated in such a manner as it is oriented in the clamp chuck of the bottom machine 10. Evident is the downward directed open end 50 of the glass container 42, which has the rolled edge 44, on which, for example, a closure can be placed. As mentioned repeatedly, the glass container 42 is separated from the remaining glass tube by a thermal severing process, for which reason the glass container 42 has its highest temperature on the bottom 46. The temperature T decreases toward the open end 50, as indicated by the arrow. As likewise mentioned, the bottom 46 has to undergo further thermal processing operations after the severing process in order to bring it into the desired form. Consequently, the bottom 46 is repeatedly heated, so that, throughout a plurality of processing steps, it has the highest temperature inside the glass container 42. The temperatures lie above the vaporization temperatures of several constituents of the glass used, so that sodium, in particular, vaporizes out of the bottom region, with sodium entraining boron as well in the form of borates, so that boron also vaporizes out of the glass. At the same time, a certain amount of sodium and boron also diffuses back into the bottom region, the degree of inward diffusion exhibiting a different temperature dependence than the degree of vaporization. The arrows in FIG. 4a indicate which of the two processes predominates. In the vicinity of the bottom, the vaporization predominates, whereas, with dropping temperature, the inward diffusion becomes increasingly stronger and attains a maximum in a delamination zone 58. If the temperature of the glass container 42 drops further, however, the inward diffusion also becomes increasingly weaker, because it becomes increasingly difficult for sodium and boron to penetrate into the glass matrix. Below a certain temperature, neither sodium nor boron can penetrate into the glass matrix and a deposit 60 forms on the glass surface.

For the delamination tendency, however, the inward diffusion is the crucial process, reaching a maximum in the delamination zone 58 at a specific distance below the bottom region.

Figure 4B:
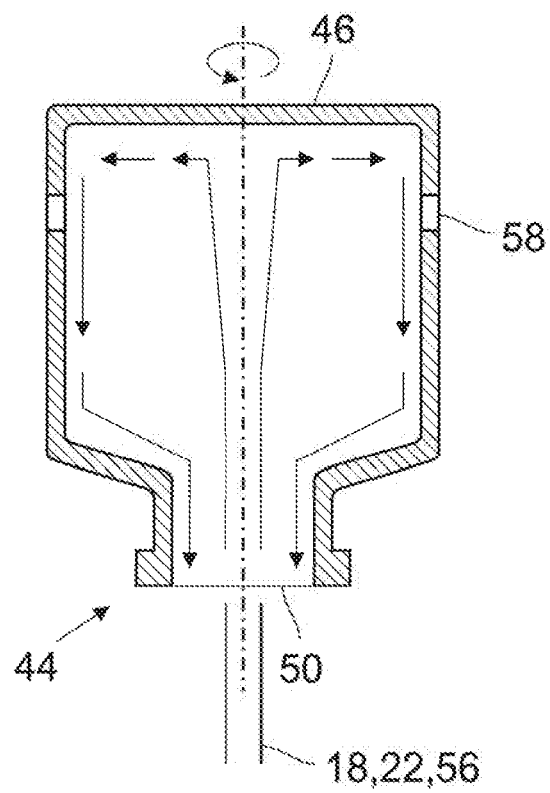

Illustrated in FIG. 4b is how, according to the invention, the gas flows through the glass container 42. From a free end 56 of the duct system 18, which may be designed as a valve 56, and represents the downstream end of the duct system 18, the gas passes concentrically to the axis of rotation of the glass container 42 through the open end 50 into the glass container 42 and flows in the direction of the bottom 46. In the process, the gas flow opens up in the radial direction somewhat and distributes itself in the bottom region, so that it flows parallel to the bottom 46 radially outward until it reaches the region of the side wall. Afterwards, the direction of flow changes such that the gas flows parallel to the side wall and back to the open end 50 and leaves the glass container 42. This flow may also be referred as a coaxial flow. The flow of gas adjusted in this way ensures that the substances that vaporize out of the bottom region, particularly sodium and boron, are discharged from the glass container 42 and cannot diffuse back into the glass or can do so only to a very small extent. The delamination zone 58 is coated with a boundary layer of the gas flow and the concentration of sodium and boron in the glass container 42 is reduced to such an extent that the inward diffusion still taking place does not lead to a noticeable delamination tendency. The depletion of the bottom 46 with respect to sodium and boron has a negative effect. The creation of the flow described here in the glass container 42 presupposes the presence of the bottom 42. However, it may nonetheless be advantageous, already prior to the formation of the bottom, to feed the gas flow into the still open glass tube in order to remove any alkali borates that may be present in the glass tube. Nor need the bottom 42 necessarily be completely closed. Small openings, such as those present in the case of syringes, do not interfere with the creation of the flow described here or do so only to a negligible extent when the opening does not exceed a certain size. The relationships illustrated in FIG. 4b represent the ideal case. However, because the valve 56, in practice, can never feed in the gas flow in a manner that is precisely concentric with the axis of rotation of the glass container 42, a non-rotationally symmetric and non-coaxial flow is established, as a result of which, in the most unfavorable case, there is no protective flow over the delamination zone 58. This negative effect can be markedly minimized by rotation of the glass container 42 around its axis of rotation, with the free end or the valve 56 of the duct system 18 remaining fixed in position.

The outer diameter of the valve 56 has to be sufficiently small in comparison to the inner diameter of the open end 50 such that the air that is blown in can readily flow out once again in a coaxial flow, without creating a backup. Because the gas that is fed in must skirt the cylindrical section of the glass container at a certain flow rate, the volume flow is proportional to the diameter of the glass container. When, in order to adjust the length, the bottom is pressed against the template, the process responsible for the delamination is already completed, so that a coaxial flow is no longer needed.

As mentioned in the beginning, it is known how to feed gas flows into the glass container 42 during the manufacturing process. On account of the gaps that the known bottom machines have within the duct system, however, it is not possible to feed a flow like that illustrated in FIG. 4b into the glass container 42. In particular, it is not possible to establish a flow that remains continuously constant. Instead, a turbulent flow is produced, which leads to back pressures, turbulence, and dead spaces, as a result of which vaporized sodium and boron cannot be removed from the glass container 42.

LIST OF REFERENCE SYMBOLS

10, $10_1$, $10_2$ bottom machine
12 stator
14 rotor
16, $16_1$-$16_8$ holding unit
18 duct system
19 stator section
20 pressure source
21 duct
22, $22_1$-$22_8$ subduct
23 rotor section
24 control or regulating device
26 switching valve
28 pressure measurement and adjustment device
30 feedthrough section
32 extension
34 gap seal
36 outlet opening
38 glass processing device
40 parent machine
42 glass container
44 rolled edge
46 bottom
48 ring-shaped duct segment
50 open end
52 projection
54 further pressure source
56 free end, valve
58 delamination zone
60 deposit
A, $A_1$-$A_8$ processing position
H axis of rotation of holding unit
R axis of rotation of rotor
T temperature
α first angle
β second angle
γ third angle

What is claimed is:

1. A bottom machine for a glass processing device for manufacturing glass containers from a glass tube, comprising:
   one or a plurality of holding units for holding the glass container or the glass tube, with the holding units being mounted so as to rotate around their own axis and around an axis of rotation of the bottom machine in order to convey the glass container or the glass tube to various processing positions,
   a pressure source for supply of a gas flow,
   a duct system communicating with the pressure source for directing the gas flow to the holding units and for feeding the gas flow into the glass tube or into the glass container,
   wherein the duct system is free of gaps and the duct system has a free end and the holding unit can rotate relative to the free end.

2. The bottom machine according to claim 1, further comprising a rotor and a stator, with the holding units being arranged on the rotor and the duct system having a first number of subducts arranged on a rotor section and a second number of subducts arranged on a stator section, and a feedthrough section for the gap-free directing of the gas flow from the stator section to the rotor section.

3. The bottom machine according to claim 2, wherein the stator and the rotor are designed such that they form a gap seal in the feedthrough section for sealing the duct system.

4. The bottom machine according to claim 3, wherein the rotor is arranged along the axis of rotation of the bottom machine so as to overlap the stator.

5. The bottom machine according to claim 4, wherein the rotor section and/or the stator section have a number of ring-shaped duct segments.

6. The bottom machine according to claim 5, wherein the ring-shaped duct segments in the feedthrough section are open in the direction of the axis of rotation of the bottom machine and projections protrude into the ring-shaped duct segments to create the gap seal.

7. The bottom machine according to claim 4, wherein the duct system has a control or regulating device for controlling or regulating the flow of gas through the duct system.

8. The bottom machine according to claim 4, wherein the duct system has another pressure source for supplying a further gas flow, which can be engaged to join the gas flow by a pressure measurement and adjustment device.

9. The bottom machine according to claim 4, wherein the bottom machine has eight subducts arranged on the stator section, eight ring-shaped duct segments, eight subducts arranged on the rotor section, and eight holding units.

10. The bottom machine according to claim 9, wherein the duct system has eight control or regulating devices and eight pressure measurement and adjustment devices.

11. The bottom machine according to claim 3, wherein the rotor is arranged radially outside of the stator.

12. The bottom machine according to claim 2, wherein the first or second subducts have an extension running in a plane perpendicular to the axis of rotation of the bottom machine in the feedthrough section.

13. The bottom machine according to claim 12, wherein the extension confines a first angle in a plane perpendicular to the axis of rotation of the bottom machine.

14. The bottom machine according to claim 2, wherein the duct system has six subducts arranged on the stator section, eight subducts arranged on the rotor section, and eight holding units.

15. The bottom machine according to claim 14, wherein five of the six subducts arranged on the stator section each have an extension.

16. The bottom machine according to claim 15, wherein the subduct of the stator section that has no extension has a switching valve with a pressure measurement and adjustment device.

17. The bottom machine according to claim 1, wherein the duct system has a control or regulating device for controlling or regulating the flow of gas through the duct system.

18. The bottom machine according to claim 1, wherein the duct system has exactly one subduct arranged on the stator and a control or regulating device on the rotor for controlling or regulating the flow of gas through the duct system.

19. A glass processing device for manufacturing glass containers from a glass tube, comprising:
a parent machine, and
a bottom machine according to claim 1.

* * * * *